United States Patent
Groot et al.

(10) Patent No.: US 9,540,184 B2
(45) Date of Patent: Jan. 10, 2017

(54) SORTING DEVICE FOR SORTING PRODUCTS

(71) Applicant: Vanderlande Industries B.V., Veghel (NL)

(72) Inventors: Frits Franciscus Carolus Groot, Boxtel (NL); Arnoldus Wilhelmus Johannes Hulsen, Gemert (NL); Marinus Adrianus Maria Potters, Eindhoven (NL); Erwin Hendrikus Petrus Martinus Johannes Van Schaijk, Vinkel (NL); Petrus Theodorus Cornelis Vervoort, Rosmalen (NL)

(73) Assignee: Vanderlande Industries B.V., Veghel (NL)

( * ) Notice: Subject to any disclaimer, the term of this patent is extended or adjusted under 35 U.S.C. 154(b) by 324 days.

(21) Appl. No.: 14/348,228

(22) PCT Filed: Sep. 27, 2012

(86) PCT No.: PCT/NL2012/050677
§ 371 (c)(1),
(2) Date: Mar. 28, 2014

(87) PCT Pub. No.: WO2013/048245
PCT Pub. Date: Apr. 4, 2013

(65) Prior Publication Data
US 2014/0309768 A1    Oct. 16, 2014

(30) Foreign Application Priority Data

Sep. 30, 2011    (NL) ..................................... 2007508

(51) Int. Cl.
*G06F 7/00*    (2006.01)
*B65G 47/46*    (2006.01)
(Continued)

(52) U.S. Cl.
CPC ................. *B65G 47/46* (2013.01); *B07C 5/34* (2013.01); *B65G 17/22* (2013.01); *B65G 47/844* (2013.01); *B65G 47/96* (2013.01); *B65G 2201/0264* (2013.01); *B65G 2207/36* (2013.01)

(58) Field of Classification Search
USPC ........................................................ 700/223
See application file for complete search history.

(56) References Cited

U.S. PATENT DOCUMENTS 4,732,259 A * 3/1988 Yu ........................ B65G 47/844
198/368
8,424,670 B2 * 4/2013 Van Den Goor .... B65G 47/844
198/370.02
(Continued)

FOREIGN PATENT DOCUMENTS

EP    1972579    9/2008
EP    2025628    2/2009
(Continued)

OTHER PUBLICATIONS

International Search Report of PCT/NL2012/050677 dated Mar. 18, 2013.

*Primary Examiner* — Kyle Logan
(74) *Attorney, Agent, or Firm* — Elizabeth A. Peters; Barnes & Thornburg LLP (57) ABSTRACT

A sorting device for sorting products, comprising successive carrier units each provided with a load carrying platform having a front arcuate edge and a rear arcuate edge. The sorting device further conveys the load carrying platforms along a conveying path and includes an elongated pusher element for each load carrying platform for pushing a product to be sorted sideways off, using at least one pusher element, at a desired sorting location. The pusher elements each extend above a load carrying platform and are designed
(Continued)

for joint transport with the load carrying platform. The sorting device further comprises two elongated passages in the load carrying platform, and drive means at least partially provided under the load carrying platforms for moving a pusher element sideways between two opposite lateral positions at a desired sorting location.

20 Claims, 3 Drawing Sheets

(51) Int. Cl.
  *B65G 47/84* (2006.01)
  *B07C 5/34* (2006.01)
  *B65G 17/22* (2006.01)
  *B65G 47/96* (2006.01)

(56) References Cited

U.S. PATENT DOCUMENTS

| | | | |
|---|---|---|---|
| 8,770,379 B2 * | 7/2014 | Van Den Goor | B65G 17/066 198/370.02 |
| 2010/0059333 A1 * | 3/2010 | Van Den Goor | B65G 17/066 198/370.02 |
| 2011/0108388 A1 * | 5/2011 | Van Den Goor | B65G 17/066 198/370.02 |

FOREIGN PATENT DOCUMENTS

| WO | WO 2009093894 | 7/2009 |
|---|---|---|
| WO | WO 2009128706 | 10/2009 |

* cited by examiner

SORTING DEVICE FOR SORTING PRODUCTS

CROSS REFERENCE TO RELATED APPLICATIONS

This application is a U.S. nationalization under 35 U.S.C. §371 of International Application No. PCT/NL2012/050677, filed Sep. 27, 2012, which claims priority to Netherlands Patent Application No. 2007508, filed Sep. 30, 2011. The disclosures set forth in the referenced applications are incorporated herein by reference in their entireties.

The present invention relates to a sorting device for sorting products, comprising successive carrier units each provided with a load carrying platform having a front arcuate edge and a rear arcuate edge, the arcuate shape of the front edge of a load carrying platform matching the arcuate shape of the rear edge of a next load carrying platform located at the front side of the load carrying platform in question, each load carrying platform being provided with a supporting surface between the front edge and the rear edge for supporting a product thereon, such as a piece of luggage or at least part thereof, the sorting device further comprising conveying means for conveying the load carrying platforms in a conveying direction along a conveying path and sorting means comprising an elongated pusher element for each load carrying platform for pushing a product to be sorted sideways off at least one supporting surface, using at least one pusher element, at a desired sorting location, said pusher elements each extending above at least part of said at least one load carrying platform and being designed for joint transport with the at least one load carrying platform in the conveying direction, two elongated passages extending transversely to the conveying direction in the respective load carrying platform, and drive means at least partially provided under the load carrying platforms for moving a pusher element sideways between two opposite extreme lateral positions at a desired sorting location, said pusher element being connected to the drive means via two connecting elements which engage a pusher element at two different longitudinal positions and which each extend through one of the two passages in the load carrying platform.

Such a sorting device is described in International patent application WO 2009/128706 A1. Each load carrying platform thereof is made up of three load carrying platform parts. The load carrying platform parts are similar to each other as regards their shape, more specifically their outer circumference. A pusher element configured as a pusher beam is provided for each load carrying platform. At its respective ends the pusher beam is connected, via connecting elements, to guide members provided under the load carrying platform, which guide members can selectively cooperate with a stationary guide at a sorting location. Upon cooperation between the guide members and the guide in question, the pusher beam crosses from one extreme lateral position to an opposite extreme lateral position, during which crossing the longitudinal direction of the pusher beam includes an angle with the conveying direction. The connecting elements extend through through slots in a front load carrying platform part and a rear load carrying platform part, respectively, forming part of one and the same load carrying platform. Thanks to the matching arcuate edges of adjacent load carrying platforms it is possible to ensure, also when passing through bends, that the supporting surfaces of the various load carrying platforms form a closed surface.

The object of the invention is to provide a sorting device of the kind described in the introduction which has a higher capacity, in the sense that it can be filled with a higher fill factor, i.e. with more products to be sorted per unit length, seen in the longitudinal direction of the successive load carrying platforms. In order to achieve that objective, the sorting device according to the invention is characterised in that the pusher element is provided asymmetrically, at least in an extreme position thereof, relative to the two associated passages. In this way it becomes possible for a pusher element to cover not only that part of the supporting surface of a load carrying platform which is located between the two associated passages during movement between the two extreme lateral positions, but also a part of the supporting surface that extends therebeyond, or possibly of a supporting surface of an adjacent load carrying platform, without this necessarily resulting in a part of a pusher element that extends beyond a passage also coming to be positioned beyond the side edges of a load carrying platform as the pusher element takes up an oblique orientation.

Preferably, the aforesaid asymmetry is realised in that at least one end of the pusher element, in an extreme position thereof, extends in the conveying direction or in the opposite direction to a position beyond at least part of a curved edge, preferably of a concavely curved edge, of the associated load carrying platform. Thus the pusher element will also cover a part of the segment that is defined by the curved edge in question upon movement between the two extreme lateral positions, at least if the orientation of the pusher element does not change during said movement.

According to another preferred embodiment, the load carrying platform is provided with an upright edge on or at least above the supporting surface thereof for guiding products to be sorted. Such an upright edge can contribute toward ensuring that the products to be sorted will end up at the correct position beside a pusher element when a product to be sorted is being supplied to a load carrying platform, which usually takes place by means of a supply conveyor that connects to the path of the successive load carrying platforms, for example at an angle of 30°. Thus it is possible in particular to prevent a product to be sorted from moving onward on the load carrying platform part, which would lead to the product to be sorted being positioned at least partially beyond the pusher element by means of which the products to be sorted must be pushed off sideways at a sorting location. Incidentally, it is noted that the characteristic aspects of the present preferred embodiment can also be applied with sorting devices of the kind described in the introduction.

The above functionality of the upright edge can be effectively realised in particular if the upright edge extends perpendicularly to the conveying direction, and/or if the upright edge extends between two pusher elements associated with two adjacent load carrying platforms, and/or if the upright edge extends at least partially into the segment that is defined by a curved, preferably convex, edge of the load carrying platform. It is possible in that case, in particular in the latter preferred embodiment, to realise a phase difference between the areas enclosed between the upright edges of two adjacent load carrying platforms and the supporting surfaces of the load carrying platforms in question. Thus, the two supporting surfaces of two adjacent load carrying platforms form part of the area between two adjacent upright edges or, in other words, of the area that is covered by the pusher element upon movement between the two extreme lateral positions.

Furthermore it has been found to be very advantageous if the load carrying platform comprises at least a front load carrying platform part provided with the front arcuate edge, a rear load carrying platform part provided with the rear arcuate edge and, between the front carrying platform part and the rear carrying platform part, an intermediate load carrying platform part, which intermediate load carrying platform part is rectangular in shape, seen in top view.

Such a configuration has constructional advantages in particular if the two passages are provided at two opposite edges of the intermediate load carrying platform part. The fact is that the rectangular shape of the intermediate load carrying platform part can match well with a straight, elongated shape of the two passages, a shape which the two passages preferably have.

It is furthermore advantageous if the front load carrying platform part, the intermediate load carrying platform part and the rear load carrying platform part are connected in such a manner as not to be pivotable about a vertical pivot axis relative to each other. Because the platform parts in question are connected in such a manner as not to be pivotable about a vertical pivot axis, a product present thereabove will experience a stable supporting surface also when passing through a bend in the horizontal plane, and there is no risk that pivoting of the load carrying platform parts relative to each other will cause the products themselves to pivot as well.

A very large degree of freedom for the movement that the pusher element can make is obtained if the drive means comprise two driving motors for each pusher element.

Said degree of freedom is increased if the pusher element is pivotally connected, about two vertical pivot axes, to the drive means via the two respective connecting elements.

Preferably, the front arcuate edge is convex in shape and the rear arcuate edge is concave in shape.

In order to prevent the dimensions of the pusher element decreasing or decreasing at least substantially, seen in a direction perpendicular to the conveying direction, when the pusher element assumes an oblique orientation, it is preferable if the pusher element comprises two telescopic parts which are telescopically movable relative to each other, one telescopic part being connected to one of the two connecting elements and the other telescopic part being connected to the other of the two connecting elements.

For cost reasons it may be advantageous not to configure the pusher element as a telescopic part. In order to make it possible to realise an oblique orientation of the pusher element all the same in that case, it is preferable if the pusher element comprises guide means for cooperation with a connecting element. Upon assuming an oblique orientation, with the spacing between the two connecting elements increasing, the connecting element can move along the guide means. Such guide means may comprise a slotted hole or a sliding edge, for example.

In order to be able to cover a maximum portion of the supporting surface, with the pusher element, it is furthermore advantageous if the two passages each extend across the entire width of the load carrying platform.

The invention will be explained in more detail hereinafter by means of a description of a preferred embodiment of a sorting device according to the invention with reference to the following schematic figures.

The sorting device 1 comprises a train of sorting units 2. In use, said (preferably endless) train moves in the conveying direction 3 along an endless conveying path (not shown).

Each sorting unit 2 comprises a chassis 4, which supports a carrier unit 5. The chassis 4, for example of the type as described in Dutch patent application NL 2005338, are connected so as to be pivotable about vertical pivot axes 6. Each chassis 4 is T-shaped, with a running wheel 7 and a guide wheel 8 being provided at the respective ends of the horizontal part of the T-shape, which wheels cooperate with guide rails 9 whose course defines the aforesaid endless conveying path.

Each carrier unit 5 comprises a load carrying platform 11 having a convex front arcuate edge 12 and a concave rear arcuate edge 13. The upper side of each load carrying platform 11, between the front edge 11 and the rear edge 12 thereof, forms a supporting surface for products to be sorted. The radii of curvature of the arcuate edges 12, 13 are identical, so that the convex front arcuate edge 12 can precisely join the concave rear arcuate edge 13 of a next load carrying platform 11. The radii of curvature of the arcuate edges 12, 13 are further selected so that the associated diameter at least substantially corresponds to the width of each load carrying platform 11.

Figure 2:
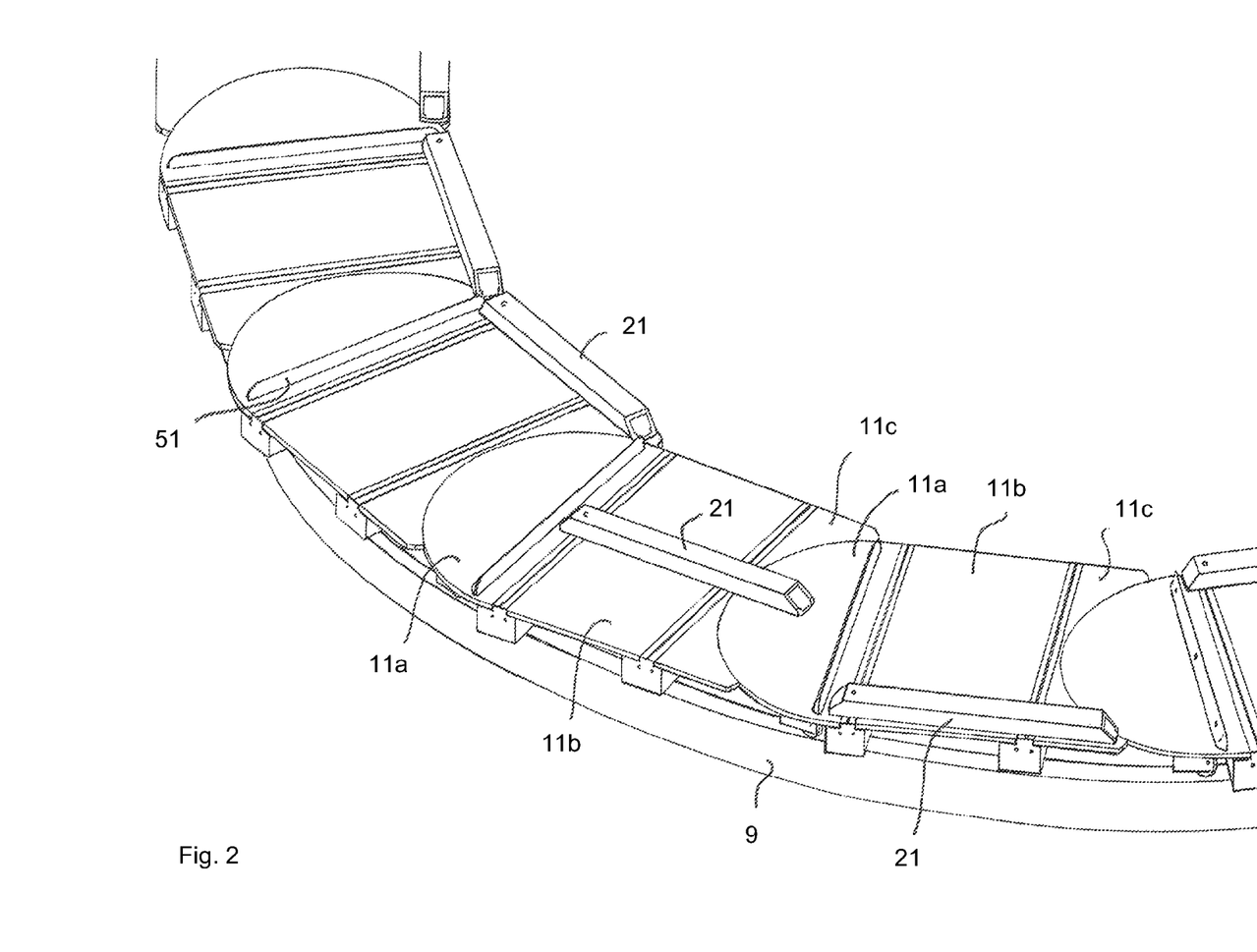
FIG. 2 shows a part of the sorting device of FIG. 1, upon passage through a horizontal bend.

Each carrier unit 5 is so positioned on an associated chassis 4 that the central axis of each arcuate edge 12, 13 coincides with a pivot axis 6. The result of this configuration is that upon passage through a horizontal bend, with successive chassis 4 pivoting about the associated pivot axes 6 relative to each other, the associated load carrying platforms 11 will likewise pivot about a pivot axis 6 relative to each other, as is shown in FIG. 2.

Each load carrying platform 11 is at least substantially made up of a front load carrying platform part 11a, a rear load carrying platform part 11c and an intermediate load carrying platform part 11b therebetween. The load carrying platform parts 11a, 11b and 11c are rigidly interconnected via transmission housings 14, 15, or at least via parts rigidly connected therewith, such as the arms 61, 62 (FIG. 3) extending in or opposite to the conveying direction 3 from the transmission housings 14, 15, which are provided at both ends of each transmission housing 14, 15. The transmission housings 14, 15 will be explained in more detail yet with reference to FIG. 3.

The front load carrying platform part 11a is at least substantially segmental in shape, the intermediate load carrying platform part 11b is rectangular in shape, the rear load carrying platform part 11c has a complementary shape, in the sense that its shape combined with the segmental shape of the front load carrying platform part 11a of a load carrying platform located therebehind is rectangular, at least in a straight part of the conveying path. Moreover, the abutting front and rear edges 12, 13 of successive load carrying platforms 11 may also have matching profiles, seen in vertical sectional view parallel to the conveying direction 3, for example according to the tongue and groove principle, or as shown in FIGS. 6a-6c of International patent application WO 09/128706 A1.

Each carrier unit 5 further comprises a pusher element configured as a pusher beam 21 directly above the supporting surface. In the present embodiment, a pusher beam 21 comprises two telescopic parts 21a, 21b, which are telescopically movable relative to each other, as shown for the middle sorting unit 2 in FIG. 1. The pusher beams 21 can move forward and backward in lateral direction between two opposite extreme lateral positions as shown for the front load carrying platform 11 and the rear load carrying platform 11, respectively, in FIG. 1. During such movement, a product present on the associated load carrying platform 11 in the area covered by the pusher beam 21 is pushed off the load carrying platform 11 at a sorting location.

To realise the lateral movement of a pusher beam 21 as described above, each carrier unit 5 is provided with drive means. The drive means engage the pusher beam 21 via two connecting elements 22, 23, which are attached to connecting blocks 26, 27 via connecting pins 24, 25. The connecting elements 22, 23 are cylindrical in shape and fit with some play into cylindrical chambers (not shown) provided in the telescopic parts 21a and 21b, respectively. The connecting blocks 26, 27 are connected to toothed belts 28, 29, which are passed over toothed wheels 30, 31. The toothed wheels 30, 31 are mounted for rotation about their horizontal axes within an associated transmission housing 14, 15, which have already been briefly discussed before. At the upper sides, the transmission housings 14, 15 are provided with two parallel section members 30, 31, which define a narrow gap 32 between them, which gap extends across the entire width of the load carrying platform 11 in question. The aforesaid connecting pins 24, 25 extend through the associated gaps 32. The gaps 32 locally interrupt the continuity of the supporting surface of the load carrying platform 11, in this case across the entire width thereof.

An electric motor 41 is provided for each toothed belt 28, 29 for driving the toothed belts, which motors are mounted on the outer side of the associated transmission housing 14, 15. Provided on the outgoing shaft of the electric motor 41 is a toothed wheel 42, over which a toothed transmission belt 43 is passed. Said toothed transmission belt 43 is also passed over a toothed wheel 44, which is configured for joint rotation with the toothed wheel 31 about a common axis. Activation of the electric motor 41 will result in the toothed belt 29 being driven and the associated connecting element 23 moving the pusher beam 21 sideways.

If the two electric motors 41 associated with a pusher beam 21 are simultaneously activated to the same extent, this will result in lateral movement of the pusher beam 21, during which lateral movement the orientation of the pusher beam 21 will not change. If the pusher beam 21 extends in the conveying direction 3 or at least parallel thereto, this orientation will be maintained during lateral movement of the pusher beam 21, therefore. Such a situation is shown in FIG. 2, for example.

Figure 1:
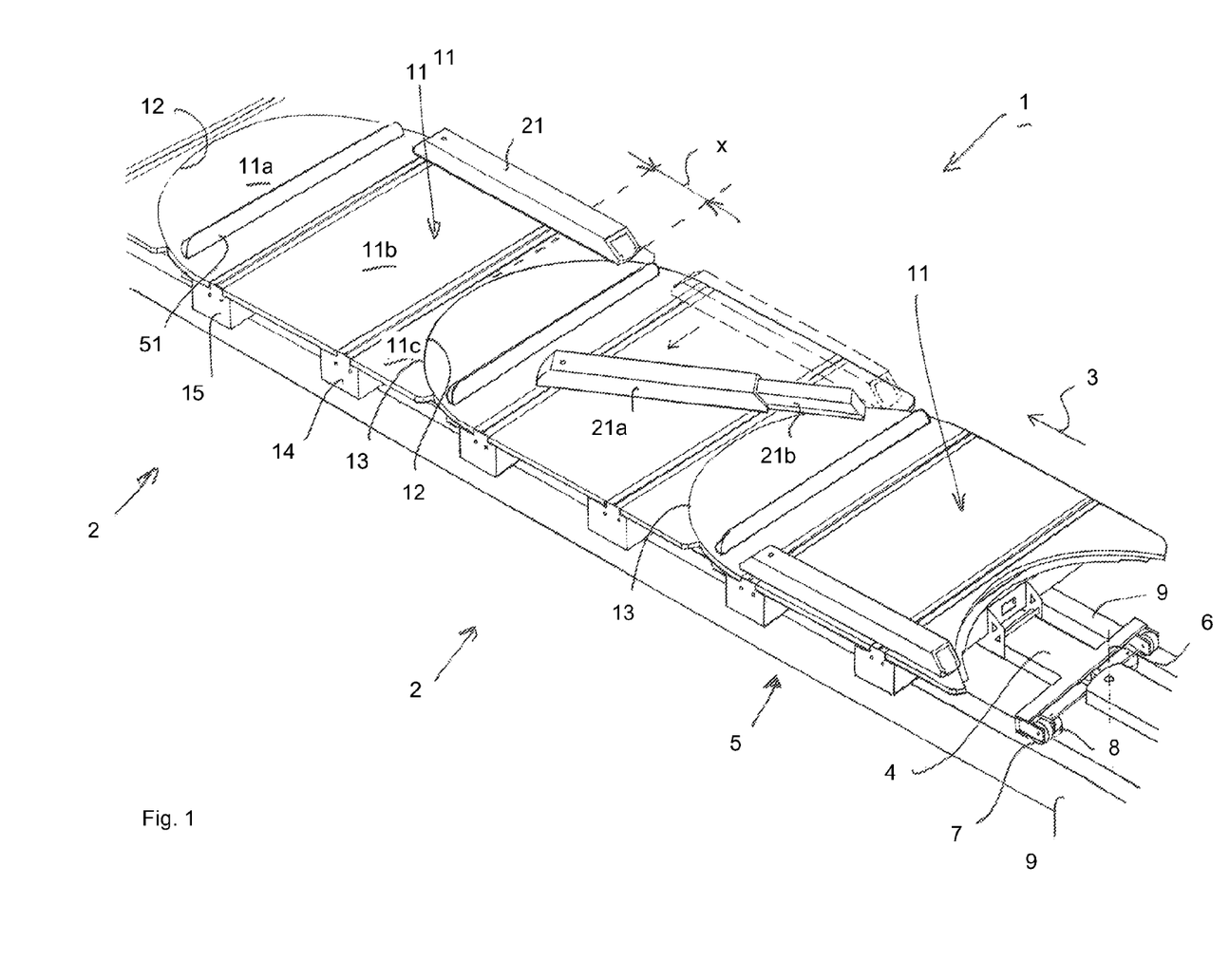
FIG. 1 shows a part of a sorting device according to the invention upon passage through a rectilinear part of a conveying path.

On the other hand, it is also possible to activate the electric motors 41 one after the other and to stop said activation one after the other again, so that the pusher beam 21 will assume an oblique orientation, as shown for the middle sorting unit 2 in FIG. 1. Since the connecting elements 22, 23 are connected to different telescopic parts 21a, 21b, the telescopic part 21a will move out over the telescopic part 21b during such a movement, as a result of which the overall length of the pusher beam 21 will increase but the rear side of the pusher beam 21 will remain at practically the same (longitudinal) position, seen in the conveying direction.

Figure 3:
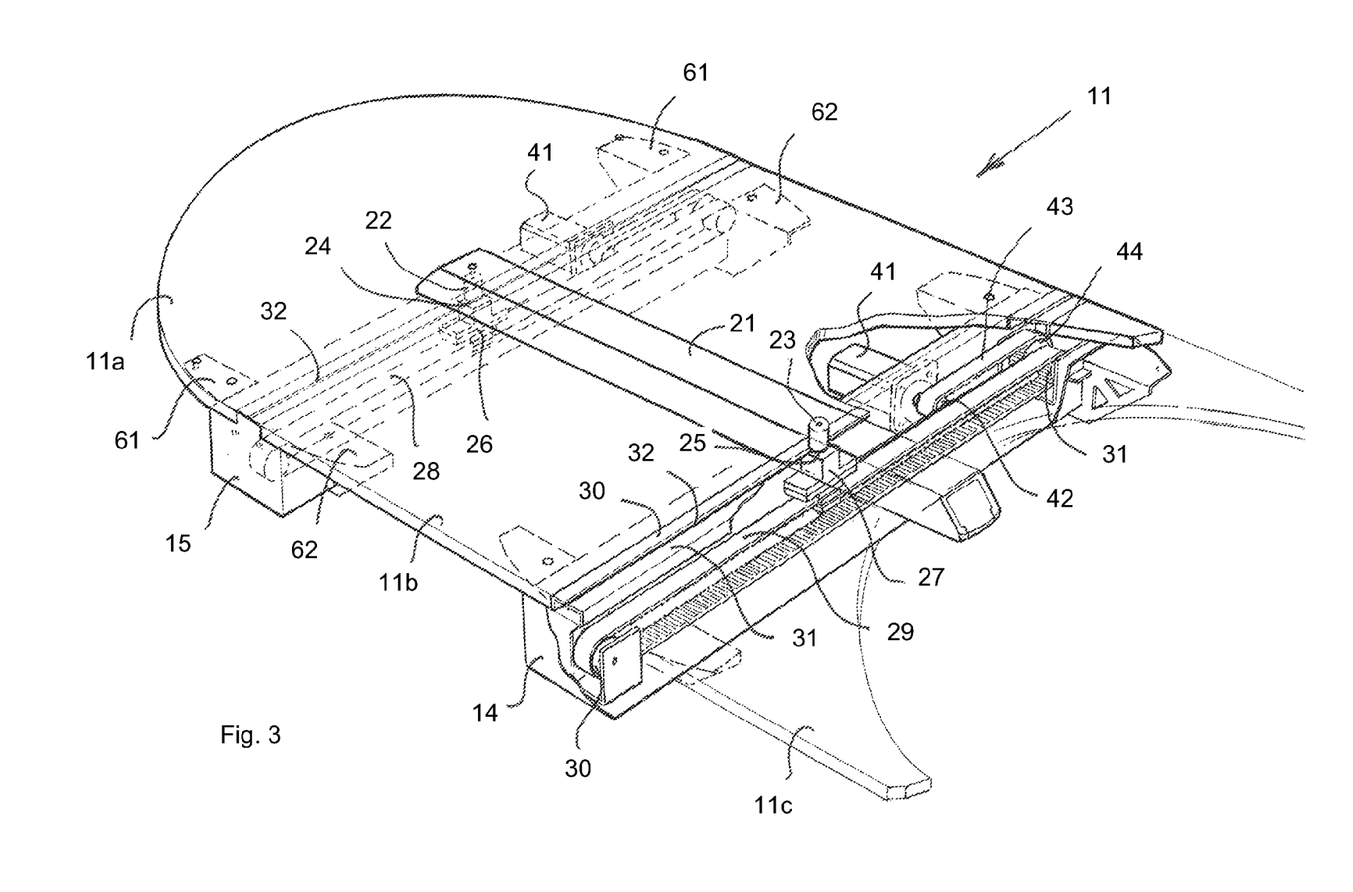
FIG. 3 is a more detailed view of a load carrying platform as used with the sorting device of FIGS. 1 and 2.

As is clearly shown in the figures, the pusher beam 21 is positioned asymmetrically relative to the two associated gaps 32. More specifically, the connecting element 22 engages the pusher beam 21 near one end thereof, whilst the connecting element 23 engages the pusher beam 21 at a point some distance away from the opposite end of the pusher beam. The rear end of the pusher beam extends to a position located at least a distance x beyond at least part of the concave rear edge 13 of the load carrying platform 11 in question, seen in a direction opposite to the conveying direction 3, in any case in an extreme lateral position, but also in an oblique orientation of the pusher beam, seen in a direction perpendicular to the conveying direction 3. During lateral movement the pusher beam 21 will thus cover not only the area of the associated load carrying platform that is located roughly between the two gaps 32 but also part of the area which is located at the rear side of the rear gap 32 of a load carrying platform and which also forms part of the area of the front load carrying platform part 11a of the load carrying platform 11 positioned therebehind. As a result, a relatively large part of the joint area of the various load carrying platforms 11 can be covered by a pusher beam 21, which has a positive effect on the sorting capacity of the sorting device 1.

The pusher beam 21 may alternatively also be configured as a single component or at least as a component not having any parts that can move telescopically relative to each other. Use is in that case made of a slotted hole, into which the connecting element 23 fits, for example. In said alternative, the extent to which the pusher beam extends behind the rear gap 32 in the case of a possible oblique orientation thereof will be smaller than or even equal to the limited extent to which the pusher beam extends beyond the front gap 32 at the front side in the case of a pusher beam 21 having telescopic parts as described above.

As FIGS. 1 and 2 further show, each load carrying platform 11 may also be provided with upright guide edges 51, in this case on the front load carrying platform parts 11a thereof. Said guide edges 51 extend perpendicularly to the conveying direction, parallel to the gaps 32, and perform a function in particular while products to be sorted are being supplied to the load carrying platform 11. It is advantageous in this regard if the product in question is positioned directly beside a pusher beam 21, so that subsequent lateral movement of the pusher beam 21 in question will actually have the desired sorting effect. There is a risk, however, that if a supply conveyor that connects to the path of the sorting units 2 at an acute angle, for example of 30°, is used for supplying products to be sorted to a load carrying platform 11, the product in question will push through. In order to prevent such pushing through, the various guide edges 51 are provided, which guide edges may in fact also be regarded as stop edges.

Although the invention has been explained in the foregoing with reference to a possible embodiment of the invention, in which the lateral movement of the pusher beams is effected by means of two on-board electric motors, it is explicitly noted that it is also possible within the framework of the present invention for the pusher beam to be driven by means of a stationary guide disposed along the path of the load carrying platforms, which guide cooperates with guide members that are connected to a pusher beam. Such a manner of driving is for example described in WO 2009/128706 A1.

It is further pointed out that it is also possible within the framework of the present invention for the conveying direction to be the reverse of the conveying direction 3 as described so far. In such a situation it will be advantageous if also the asymmetry of the pusher beam is reversed. That is, the telescopic part 21b would be located on the side of the convex edge 12 (which would be characterised as the rear edge in that case), and the end of the telescopic part 21a would be provided at the location of the housing part 14. This would also imply, of course, that the longitudinal positions of the guide edges 51, if used, would shift.

The lateral drive of the pusher beam, each by means of two drive units which move along with the pusher beam and which engage at different longitudinal positions of the pusher beam, makes it possible to have the pusher beam move to and fro in different ways between the two extreme lateral positions. It is conceivable, and even advantageous, for example, to detect the position of a product to be sorted on a load carrying platform after the load carrying platform has been loaded with the product. This can for example take place by means of a camera disposed along the path of the sorting device. After the position of the product has been established, the electric motors 41 can be controlled by the control system (not shown) in such a manner that the pusher beam comes to abut against the product to be sorted. The pusher beam may to that end approach the product at a high speed, for example, and subsequently move toward the product at a lower speed until it abuts against the product. Upon subsequently reaching a location where the product in question is to be sorted out on a longitudinal side, the electric motors are activated by the control means so as to have the desired sorting out take place. A method as described above has the important advantage that the mechanical load applied to a product by the pusher beam for sorting out the product and on the driving mechanism of the pusher beam will be considerably lower.

Alternatively, a pusher beam could also approach the product to be sorted at a relatively low speed until sensor means detect an increased load on one or both electric motors 41, indicating that the pusher beam abuts against the product to be sorted. Another alternative is to equip the pusher beams with contact sensors, so that contact with a product to be sorted can be detected.

If the sorting out of the product takes place on a discharge conveyor (for example a conveyor belt or a discharge chute) that connects to a downstream part of the path of the sorting device at an acute angle, with the orientation of the product to be sorted relative to the conveying direction of the product itself remaining unchanged (in the case of a rectangular product a short side that is located at the front side on the sorting device will also be located at the front side on the discharge conveyor), it may also be very advantageous to change the orientation of the product before sorting out takes place, such that the product will already be aligned with the direction of the discharge conveyor at the location of the connection. The above-described abutment can to that end be effected by a pusher beam whose longitudinal direction is geared to the direction of the discharge conveyor. The pusher beam can already turn the product slightly on the load carrying platform. To have the transfer of the product from a load carrying platform to a discharge conveyor take place with a maximum degree of reliability, it is furthermore possible to impart an acceleration to the pusher beam by activating one or both electric motors 41 shortly before the product leaves a load carrying platform entirely.

Another possibility is to move the product onwards preparatorily, once it abuts against the pusher beam, to a lateral edge of the load carrying platform, so that the actual movement of the pusher beam during the sorting-out process will be as small as possible and the sorting out will take as little time as possible. This in turn makes it possible to provide sorting locations relatively close behind each other.

Another advantageous possibility that is being offered is that also products whose length is greater than the length of an individual load carrying platform 11 can be sorted if no use is made of guide edges 51. The product is in that case carried on at least two successive load carrying platforms 11, with the two pusher beams 21 associated with said two load carrying platforms 11 positioned beside the long product. Sorting out can take place whilst the pusher beams include an angle with the conveying direction 3 and are aligned with each other.

In a further variant for sorting relatively small products or sorting products from relatively wide load carrying platforms, a position located in the middle of the width of the load carrying platform can be used as the starting position for the pusher beam. Products to be sorted can in that case be supplied to the load carrying platform on either side of the pusher beam, whereupon sorting out can take place by moving the pusher beam to one of the extreme lateral positions, during which movement the pusher beam may or may not assume an oblique orientation.

The sorting out as described above in various variants can take place in straight parts of the conveying path as well as in bends.

Within the framework of the above, the present publication also relates to a method for using a sorting device for sorting products, comprising successive carrier units each provided with a load carrying platform having a front edge and a rear edge, each load carrying platform being provided with a supporting surface between the front edge and the rear edge for supporting a product thereon, such as a piece of luggage or at least part thereof, the sorting device further comprising conveying means for conveying the load carrying platforms in a conveying direction along a conveying path and sorting means comprising an elongated pusher element for each load carrying platform for pushing a product to be sorted sideways off at least one supporting surface, using at least one pusher element, at a desired sorting location, said pusher elements each extending above at least part of said at least one load carrying platform and being designed for joint transport with the at least one load carrying platform in the conveying direction, and drive means at least partially provided under the load carrying platforms for moving a pusher element sideways between two opposite extreme lateral positions at a desired sorting location, said pusher element being pivotally connected, about two vertical pivot axes, to the drive means via two connecting elements which engage a pusher element at two different longitudinal positions, and the drive means comprising two electric motors individually controlled by control means for lateral movement of the two respective connecting elements, the method comprising the steps of A loading a load carrying platform with a product to be sorted out at a specific sorting location B moving the pusher element associated with the load carrying platform sideways at said specific sorting location for sorting out the product C moving the pusher element sideways to a stationary position prior to step B, in which position the pusher element abuts or at least substantially abuts against the product to be sorted out.

Preferably, use is made of detection means in step C, which detection means detect the position of the product to be sorted out on the load carrying platform after step A and which control the electric motors in dependence on said detection so as to bring about the stationary position.

The invention claimed is:

1. A sorting device for sorting products, comprising:
successive carrier units each provided with a load carrying platform having a front arcuate edge and a rear arcuate edge, the arcuate shape of the front edge of a load carrying platform matching the arcuate shape of the rear edge of a next load carrying platform located at the front side of the load carrying platform in question, wherein each load carrying platform being provided with a supporting surface between the front edge and the rear edge for supporting a product thereon, such as a piece of luggage or at least part thereof;

conveying means for conveying the load carrying platforms in a conveying direction along a conveying path; and sorting means comprising an elongated pusher element for each load carrying platform for pushing a product to be sorted sideways off at least one supporting surface, using at least one pusher element, at a desired sorting location, said pusher elements each extending above at least part of said at least one load carrying platform and being designed for joint transport with the at least one load carrying platform in the conveying direction;

two elongated passages extending transversely to the conveying direction in the respective load carrying platform;

drive means at least partially provided under the load carrying platforms for moving a pusher element sideways between two opposite extreme lateral positions at a desired sorting location, said pusher element being connected to the drive means via two connecting elements which engage a pusher element at two different longitudinal positions and which each extend through one of the two passages in the load carrying platform; and wherein the pusher element is provided asymmetrically relative to the two associated passages, at least in an extreme position thereof.

2. A sorting device according to claim 1, wherein at least one end of the pusher element, in an extreme position thereof, extends in the conveying direction or in the opposite direction to a position beyond at least part of a curved edge of the associated load carrying platform.

3. A sorting device according to claim 2, wherein at least one end of the pusher element, in an extreme position thereof, extends in the conveying direction or in the opposite direction to a position beyond at least part of a concavely curved edge of the associated load carrying platform.

4. A sorting device according to claim 1, wherein the load carrying platform is provided with an upright edge on or at least above the supporting surface thereof for guiding products to be sorted.

5. A sorting device according to claim 4, wherein the upright edge extends perpendicularly to the conveying direction.

6. A sorting device according to claim 4, wherein the upright edge extends between two pusher elements associated with two adjacent load carrying platforms.

7. A sorting device according to claim 4, wherein the upright edge extends at least partially into the segment that is defined by a curved, preferably convex, edge of the load carrying platform.

8. A sorting device according to claim 1, wherein the load carrying platform comprises at least a front load carrying platform part provided with the front arcuate edge, a rear load carrying platform part provided with the rear arcuate edge and, between the front carrying platform part and the rear carrying platform part, an intermediate load carrying platform part, which intermediate load carrying platform part is rectangular in shape, seen in top view.

9. A sorting device according to claim 8, wherein the two passages are provided at two opposite edges of the intermediate load carrying platform part.

10. A sorting device according to claim 8, wherein the front load carrying platform part, the intermediate load carrying platform part and the rear load carrying platform part are connected in such a manner as not to be pivotable about a vertical pivot axis relative to each other.

11. A sorting device according to claim 1, wherein the drive means comprise two driving motors for each pusher element.

12. A sorting device according to claim 1, wherein the pusher element is pivotally connected, about two vertical pivot axes, to the drive means via the two respective connecting elements.

13. A sorting device according to claim 1, wherein the front arcuate edge is convex in shape and the rear arcuate edge is concave in shape.

14. A sorting device according to claim 1, wherein the pusher element comprises two telescopic members which are telescopically movable relative to each other, one telescopic member being connected to one of the two connecting elements and the other telescopic member being connected to the other of the two connecting elements.

15. A sorting device according to claim 1, wherein the pusher element comprises guide means for cooperation with a connecting element.

16. A sorting device according to claim 1, wherein the two passages each extend across the entire width of the load carrying platform.

17. A sorting device according to claim 1, wherein the pusher element extends in the conveying direction, at least in an extreme position thereof.

18. A method for using a sorting device for sorting products, comprising:

providing successive carrier units each with a load carrying platform having a front edge and a rear edge, each load carrying platform being provided with a supporting surface between the front edge and the rear edge for supporting a product thereon, such as a piece of luggage or at least part thereof;

providing conveying means for conveying the load carrying platforms in a conveying direction along a conveying path;

providing sorting means comprising an elongated pusher element for each load carrying platform for pushing a product to be sorted sideways off at least one supporting surface, using at least one pusher element, at a desired sorting location, said pusher elements each extending above at least part of said at least one load carrying platform and being designed for joint transport with the at least one load carrying platform in the conveying direction;

providing drive means at least partially under the load carrying platforms for moving a pusher element sideways between two opposite extreme lateral positions at a desired sorting location, said pusher element being pivotally connected, about two vertical pivot axes, to the drive means via two connecting elements which engage a pusher element at two different longitudinal positions, and the drive means comprising two electric motors individually controlled by control means for lateral movement of the two respective connecting elements;

loading a load carrying platform with a product to be sorted out at a specific sorting location;

moving the pusher element associated with the load carrying platform sideways to a stationary position in which the pusher element abuts or at least substantially abuts against the product to be sorted out; and moving the pusher element associated with the load carrying platform sideways at said specific sorting location for sorting out the product.

19. A method according to claim 18, wherein the pusher element is positioned between the two extreme lateral positions, preferably centrally between the two extreme lateral positions.

20. A method according to claim 18, wherein the sorting device comprises two passages extending transversely to the conveying direction in each load carrying platform, and wherein each of the connecting elements extends through a passage.

\* \* \* \* \*